US008768320B2

(12) United States Patent
Sapp

(10) Patent No.: US 8,768,320 B2
(45) Date of Patent: Jul. 1, 2014

(54) PRE-PROGRAMMED SUBSCRIBER RESPONSE

(75) Inventor: Kevin Allen Sapp, Cary, NC (US)

(73) Assignee: Qualcomm Incorporated, San Diego, CA (US)

( * ) Notice: Subject to any disclaimer, the term of this patent is extended or adjusted under 35 U.S.C. 154(b) by 1044 days.

(21) Appl. No.: 11/689,084

(22) Filed: Mar. 21, 2007

(65) Prior Publication Data

US 2008/0233932 A1 Sep. 25, 2008

(51) Int. Cl.
*H04M 3/42* (2006.01)
*G06Q 10/10* (2012.01)
*H04L 12/58* (2006.01)

(52) U.S. Cl.
CPC ............ *H04L 12/5895* (2013.01); *G06Q 10/10* (2013.01); *H04L 51/38* (2013.01)
USPC ......... 455/415; 455/566; 379/88.18; 709/201

(58) Field of Classification Search
CPC ..... H04L 51/38; H04L 12/5895; G06Q 10/10
USPC ................ 455/418, 413, 455, 406, 408, 419, 455/456.3, 151.1, 62, 405, 415, 566; 380/247, 59, 273; 709/201, 208, 203; 379/201.04, 114.2, 157, 88.13
See application file for complete search history.

(56) References Cited

U.S. PATENT DOCUMENTS

| | | | | |
|---|---|---|---|---|
| 5,675,752 A | * | 10/1997 | Scott et al. | 715/866 |
| 6,061,439 A | * | 5/2000 | Bleile et al. | 379/201.04 |
| 7,443,962 B2 | * | 10/2008 | Basu | 379/88.18 |
| 7,711,565 B1 | * | 5/2010 | Gazdzinski | 704/270 |
| 2002/0161634 A1 | * | 10/2002 | Kaars | 705/14 |
| 2003/0120732 A1 | * | 6/2003 | Couts et al. | 709/206 |
| 2004/0192263 A1 | * | 9/2004 | Tomikawa et al. | 455/413 |
| 2007/0021149 A1 | * | 1/2007 | Abbassikhah | 455/558 |
| 2008/0059605 A1 | * | 3/2008 | Shalev et al. | 709/217 |
| 2009/0144634 A1 | * | 6/2009 | Berger | 715/747 |

FOREIGN PATENT DOCUMENTS

| | | |
|---|---|---|
| EP | 1460867 | 9/2004 |
| JP | 4168863 A | 6/1992 |

(Continued)

OTHER PUBLICATIONS

Context, Nov. 6, 2012, http://thesaurus.yourdictionary.com/context, see p. 2-3 (highlighted words).*

(Continued)

*Primary Examiner* — Mahendra Patel
(74) *Attorney, Agent, or Firm* — James T. Hagler

(57) ABSTRACT

Methods and apparatuses are disclosed herein for providing pre-programmed responses to received communications. A communication is received and identified. The communication is associated with a pre-programmed response and a response to the communication is generated using the pre-programmed response. Additionally, a context for the pre-programmed response can be established and the pre-programmed response can be based on the context and the communication identification. The communication can include a voice call, text message, Voice-Over-Internet Protocol (VoIP) call, or push-to-talk (PTT) call.

19 Claims, 6 Drawing Sheets

(56) References Cited

FOREIGN PATENT DOCUMENTS

| | | |
|---|---|---|
| JP | 2003125453 | 4/2003 |
| JP | 2004304236 A | 10/2004 |
| JP | 2005191952 A | 7/2005 |
| JP | 2006229640 A | 8/2006 |
| JP | 2006324911 A | 11/2006 |
| KR | 1020040072675 A | 8/2004 |
| WO | WO 2006078683 A2 | 7/2006 |

OTHER PUBLICATIONS

International Search Report—PCT/US08/057617—International Search Authority, European Patent Office—Aug. 11, 2008.

Written Opinion—PCT/US08/057617—International Search Authority, European Patent Office—Aug. 11, 2008.

* cited by examiner

PRE-PROGRAMMED SUBSCRIBER RESPONSE

FIELD OF DISCLOSURE

The embodiments of the invention relate generally to communications processing and more specifically to pre-programmed subscriber responses to received communications.

BACKGROUND

Conventional communication systems conventionally have two options when a call is received at a subscriber's communication device. Specifically, the call can be answered or the call can be allowed to go to a voice messaging system. Additionally, conventional systems allow certain options to control when these actions occur. For example, a subscriber may forward his phone to voicemail to prevent interruptions. Also, some centralized phone management systems allow for different messages to be generated based upon the time and/or date, such as an after hours message may be played when a business is not open. Further, conventional systems also allow subscribers to select specific ring tones to identify the source of an incoming call. Based upon these customized ring tones a subscriber may answer or ignore a call.

Although there are many circumstances where these options are sufficient, there are also situations where a more personal and/or contextually accurate response would be preferable. These situations may be more prevalent in conjunction with mobile terminals that allow access to subscribers in a variety of situations. For example, a fixed terminal (e.g., a land line phone in an office) has limited situational context when the subscriber is available to receive a call (i.e., the subscriber is present or not present in his office). However, with mobile terminals, subscribers may have the ability to answer the call in variety of places/situations (e.g., meeting, theater, or restaurant) where they do not wish or are not permitted to answer the call.

Accordingly, it would be beneficial to allow for more options for responses when a call is received at a subscriber terminal.

SUMMARY

Embodiments disclosed herein provide pre-programmed subscriber responses to received communications.

Accordingly, an embodiment of the invention includes a method including receiving a communication, identifying the communication, associating the communication with a pre-programmed response, and responding to the communication using the pre-programmed response.

Another embodiment of the invention includes an apparatus including logic configured to receive a communication, logic configured to identify the communication, logic configured to associate the communication with a pre-programmed response, and logic configured to respond to the communication using the pre-programmed response.

Another embodiment of the invention includes a computer readable media embodying a method for pre-programmed subscriber responses. The method can include receiving a communication, identifying the communication, associating the communication with a pre-programmed response, and responding to the communication using the pre-programmed response.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
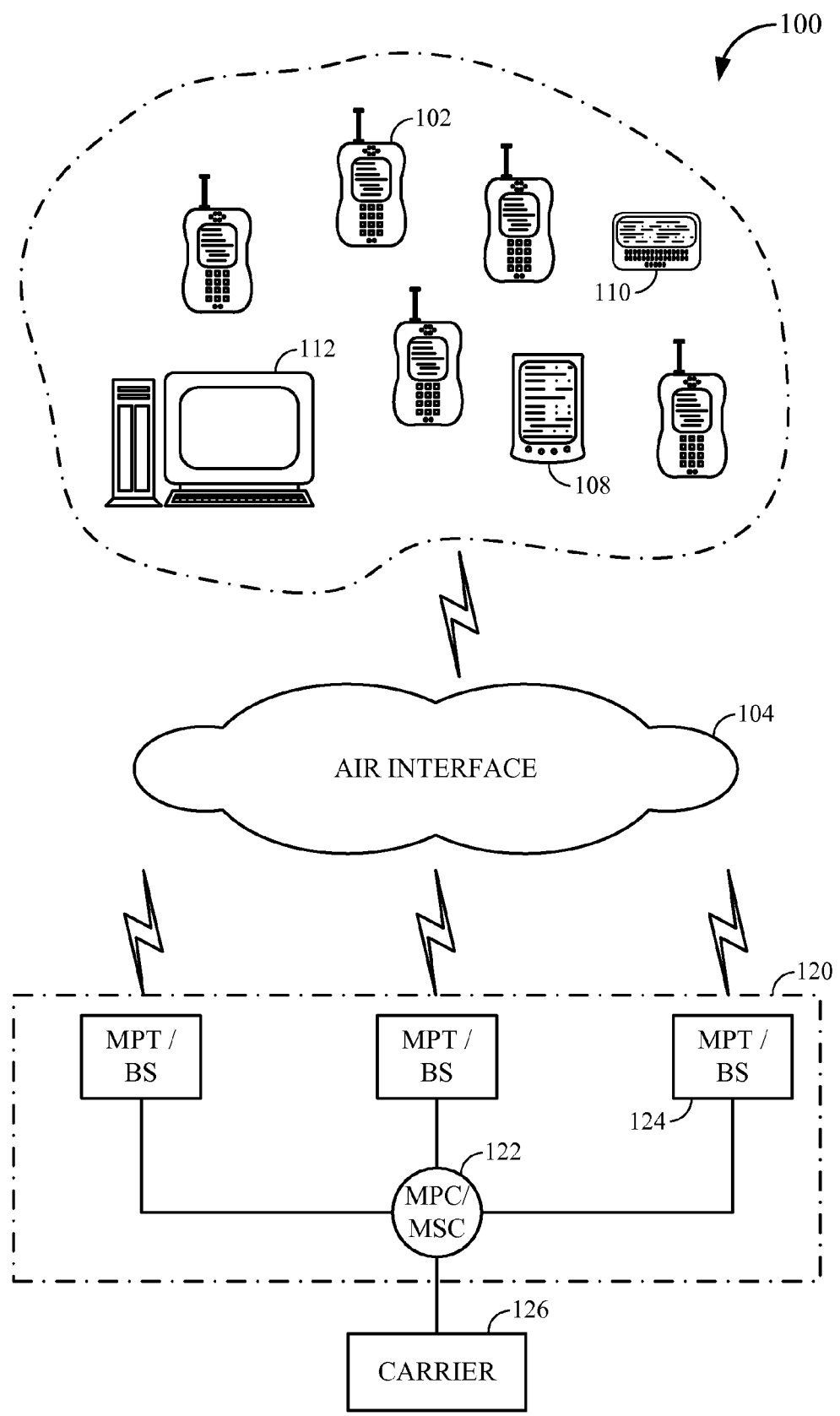
FIG. 1 is a block diagram illustrating a wireless network architecture that supports access terminals.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the terms "embodiments and "embodiments of the invention" do not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller and/or mobile switching center (MSC). Modem pool transceivers and modem pool controllers are parts of a network called an access network. An access network can transports data packets to and between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "subscriber terminal", "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, wireless network carrier 126, the Internet, and/or other remote servers.

The RAN 120 controls messages (conventionally sent as data packets) sent to a MPC/MSC 122. The carrier network 126 may communicate with the MPC/MSC 122 by a network, the Internet and/or a public switched telephone network (PSTN). Alternatively, the MPC/MSC 122 may connect directly to the Internet or external network. Conventionally, the network or Internet connection between the carrier network 126 and the MPC/MSC 122 transfers data, and the PSTN transfers voice information. The MPC/MSC 122 can be connected to multiple base stations (BS) or modem pool transceivers (MPT) 124. In a similar manner to the carrier network, the MPC/MSC 122 is conventionally connected to the MPT/BS 124 by a network, the Internet and/or PSTN for data transfer and/or voice information. The MPT/BS 124 can broadcast voice and data messages wirelessly to the access terminals, such as cellular telephone 102. The MPT/BS 124, MPC/MSC 122 and other components may form the RAN 120, as is known in the art. However, alternate configurations may also be used and the invention is not limited to the configuration illustrated.

Figure 2:
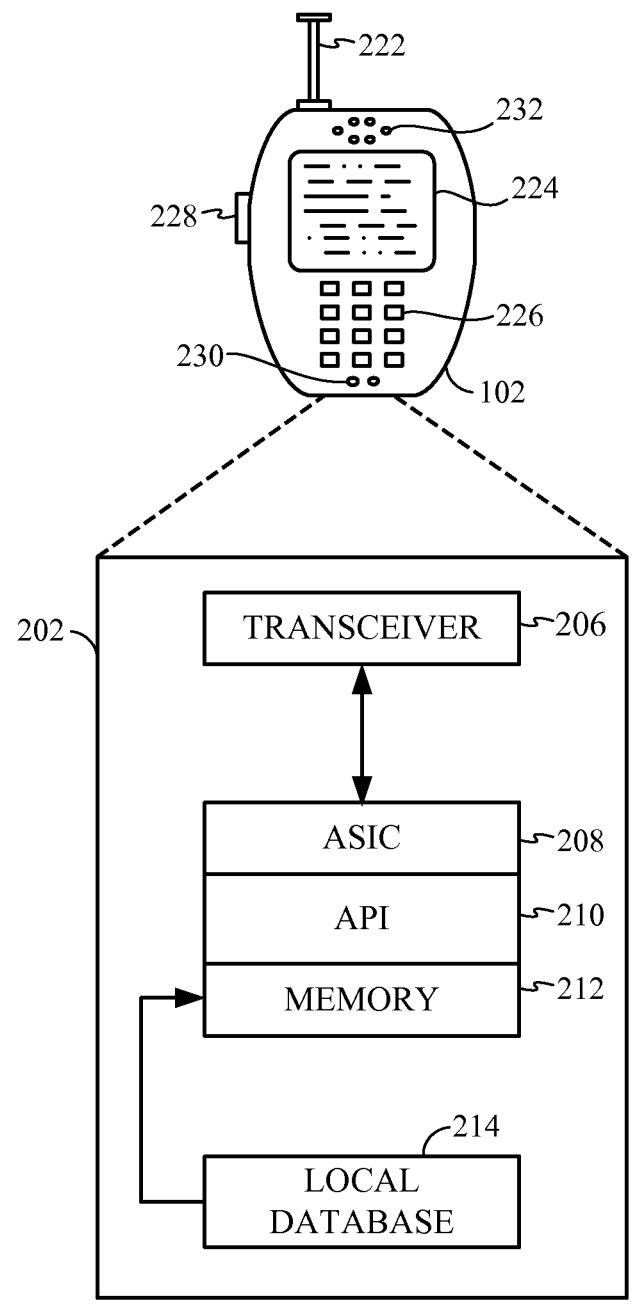
FIG. 2 is a block diagram illustrating an access terminal.

Referring to FIG. 2, the access terminal 102, such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is conventionally a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, keypad 226, push-to-talk button 228, audio input 230 and audio output 232 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 2 are to be considered merely illustrative and the invention is not limited to the illustrated features or arrangement.

As discussed in the background section, conventional systems provide limited alternatives for responding to incoming calls. For example, most subscribers in a meeting or at a theater will look at who is calling and then either ignore the call or excuse themselves to take the call privately. However, embodiments of the invention provide the ability to customize responses in advance, which can be stored either at the phone, the carrier and/or other remote server coupled to the communication network. In one embodiment, this allows the subscriber to examine who is calling and select a preprogrammed response when the call is received. For example, the message may say "In a meeting, I'll call you back in an hour" or "I am not familiar with your phone number, if this is a sales call please take me off your list". Additionally, embodiments of the invention can provide for automatic responses and contextually based selections based on the identity of the caller.

For example, using the phone or network storage, the subscriber can record custom voice messages. Each voice message can be given a unique index. When a call is received, the subscriber has the ability to choose to answer, ignore or send one of the pre-programmed voice messages. The choice can be selected interactively by the subscriber or can be automatically determined based on the caller's identity (e.g., via caller ID).

The following description of embodiments of the invention is directed mainly to voice calls and pre-programmed messages in response thereto. However the invention is not limited to these examples. Those skilled in the art will appreciate that the embodiments of the invention can include text messaging, Voice-Over-Internet Protocol (VoIP) calls, push-to-talk (PTT) calls, and the like. Accordingly, the examples provided herein are solely for purposes of illustration of embodiments of the invention and are not to be construed as limiting the scope of the embodiments.

Figure 3:
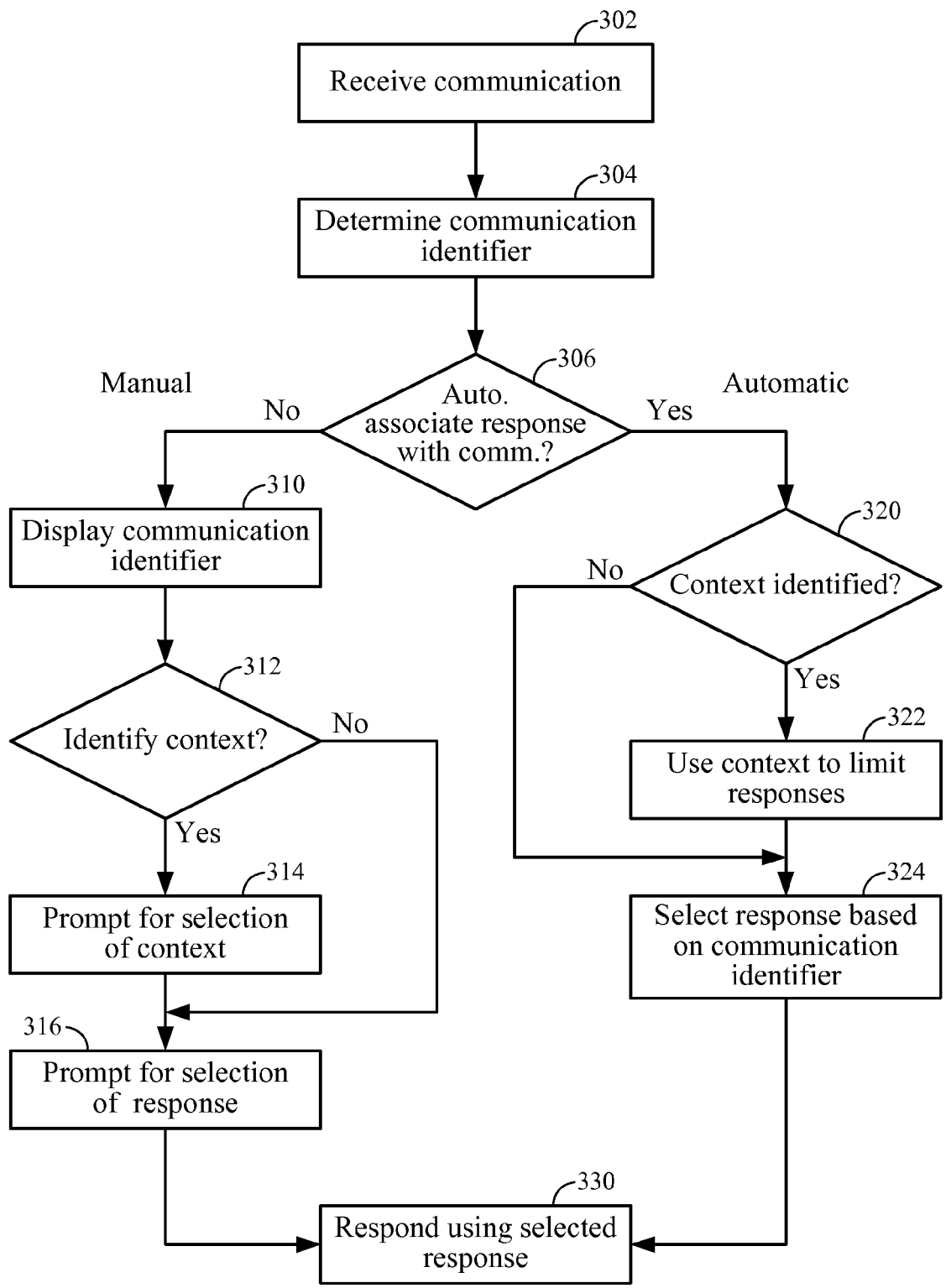
FIG. 3 is a flowchart illustrating aspects of a process for a preprogrammed subscriber response.

Referring to FIG. 3, a flowchart illustrating aspects of the invention is provided. A communication is received, 302. The communication is identified, 304. The identification can be extracting a caller ID, phone number, or name. Alternatively, the identification can involve determining the type of communication (e.g., voice call, text message, PTT, VoIP), and identity data (e.g., caller ID, phone number, name, email address, Internet Protocol (IP) address). Using the identity and/or communication type information, the response can be determined. For example, a voice call may be identified by name based on the phone number and the information that is stored on the access terminal (e.g., in a contact list). The access terminal can also store information such as a category (e.g., Personal, Business, also in a contact list) which can be associated with identification data (e.g., phone number, name) and used to select the pre-programmed response. The system can then check if an automatic response is programmed for the received communication (e.g., based on the caller ID, name, category, and the like), 306. If an automatic response is not selected for the received communication, then the identification information for the communication can be displayed at the access terminal, 310. This information may include, for example, the type of communication (e.g., voice call, text message), source (e.g., name, phone number) and/or category of the source (e.g., business, personal). The subscriber may optionally select a context (e.g., meeting, theater, vacation) to refine the selection of appropriate responses, 312. This may be set in advance or selected at the time of the call, if this option is available. If this option is available and not pre-selected, the subscriber can be prompted to select the context, 314 (see, e.g., FIG. 6A). After the context is selected or if no context is selected, the subscriber can be provided with a list of responses to select, 316 (see, e.g., FIG. 6B). Once selected, the response can be initiated, 330. For example, a pre-programmed voice message could tell the caller that the subscriber is in a meeting and will return the call immediately following the meeting. Providing callers with context appropriate response messages may help to avoid problems such as receiving multiple calls from the same caller as many callers will call back repeatedly instead of leaving a voicemail.

In an automatic mode, the matter of selecting the response may not require any subscriber interaction. For example, based on the communication identifier (e.g., caller ID on an incoming call), a pre-programmed response may be selected, 324 and the selected response initiated, 330. The selected response may be the same for all situations or the subscriber may provide some context information that can refine the automatic selection that can be detected, 320 and used to limit the responses for selection, 322 and then the context appropriate response will be selected, 324.

For example, instead of recording specific messages for each event, a subscriber may establish a series of alternative responses based on several criteria, such as a context (e.g., meeting, theater, etc.), type of communication (e.g., voice call, text message, etc.), and specific identity or category of the caller. In one example, the context can be a "Vacation", the communication can be a voice call and the caller can be in a "Personal" category. Given these parameters, the call may be passed through in a conventional matter which would be the appropriate response. However, in an alternate example, the context can be a "Vacation", the communication a voice call and the caller in a "Business" category. Given these parameters, the call may result in the system automatically selecting a prerecorded message that states the end date of the vacation and that the call will be returned on the next business day following the vacation end date. The responses may be reversed in the "Meeting" context, where callers from the "Business" category may be passed through for review by the subscriber and callers in the "Personal" category may automatically get a message stating the subscriber is in a meeting and will return the call after the meeting. If one automatic message is assigned for a caller or category then the context the response will be selected based on the communication identifier information. Further, even if there are multiple messages for each category, a default message for each category can be used in the event no context is selected.

Figure 4:
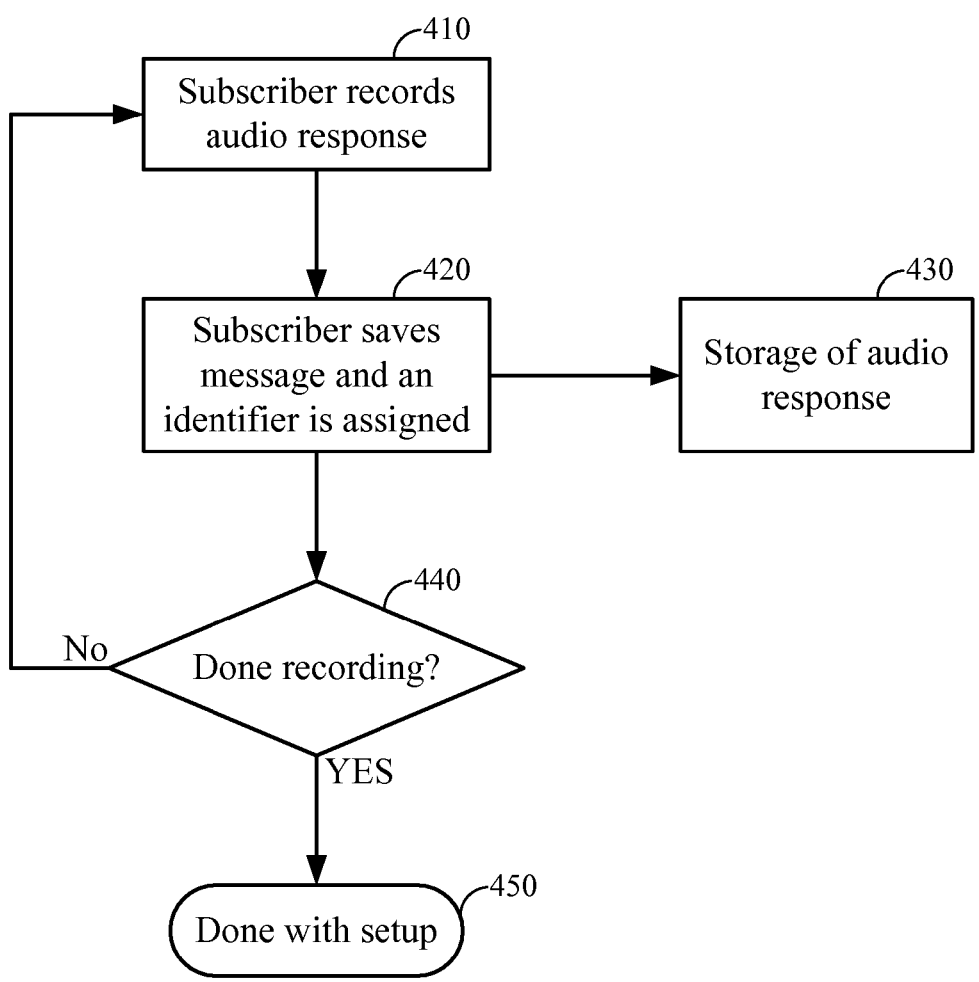
FIG. 4 is a flowchart illustrating additional aspects of a process for a preprogrammed subscriber response.

FIG. 4 illustrates a flowchart of a method for recording audio messages according to at least one embodiment of the invention. In the discussion herein, a subscriber is considered the owner or actual user of the access terminal and a caller is a person calling the subscriber. The initialization may start with a subscriber recording audio responses that may be used in the pre-programmed response to a received call, 410. The subscriber can save the message and assign an identifier (e.g., name, number and/or text), 420. The message can be an audio response that is stored in memory on the access terminal and/or provider network storage, 430. If the subscriber is done recording messages, 440, then this setup process is complete, 450. If the subscriber has not completed recording the messages, then the subscriber can continue recording, 410 and repeat the process. Those skilled in the art will appreciate the invention is not limited to the described features. For example, embodiments of the invention can include pre-programmed text responses to text messages. In the foregoing description, instead of an audio response being recorded, a text message can be entered, assigned an identifier, and stored for later retrieval as a response to a received communication. Additionally, the messages can also be assigned to specific contacts, categories and/or contexts to facilitate message selection, as discussed herein.

Further, in another aspect of the embodiments, the audio recorded can be assigned as introductory audio for each contact. If available, the introductory audio can be combined with the pre-programmed responses to provide a more customized response. For example, instead of just getting a pre-programmed response telling the caller the subscriber is in a meeting and will call them afterward, the introductory audio can personalize the pre-programmed response (e.g., "Hi John" then "I am in a meeting . . . "). Accordingly, the caller can receive a more personalized response that also includes an audio indication that the subscriber knows who to respond to.

As discussed above, the pre-programmed responses can be stored on the access terminal, a server, or a combination of both. As used herein the term "server" refers to any device coupled to the communication network and capable of communicating with the access terminal and incoming callers. Likewise, the functions described herein may be located on the access terminal, a server or a combination of both. For example, an automatic mode (e.g., as discussed in relation to FIG. 3) may be implemented in a server on the carrier network so that calls are screened even before being forwarded to the access terminal. Further, in other embodiments, the access terminal and a server can work in cooperation. For example, to reduce storage and processor load on the access terminal, the access terminal can be used as the interface for selection of the pre-programmed responses. However, the actual storage and processing of the pre-programmed response can be performed on the server.

Figure 5:
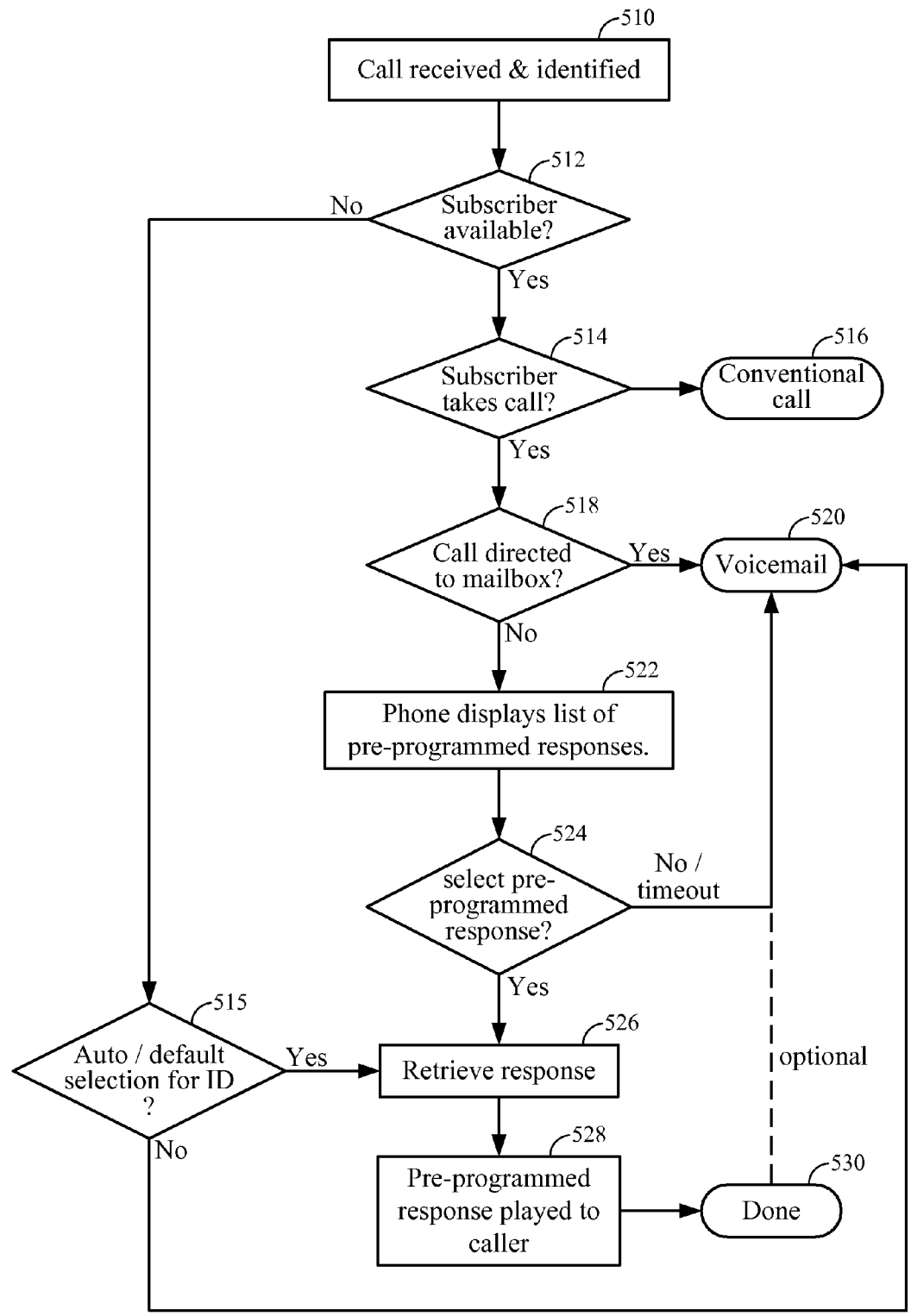
FIG. 5 is a flowchart illustrating additional aspects of a process for a preprogrammed subscriber response.

FIG. 5 illustrates a flowchart of a method for processing received communications according to at least one embodiment of the invention. In the illustrated method the communication is a voice call, which is presented to facilitate the explanation and not to limit the embodiments of the invention. A call is received and identified, 510. The subscriber can examine the identification information (e.g., caller ID), 512, if the subscriber is available. If the subscriber is not available, the process can continue to an automatic selection (e.g., as discussed in relation to FIG. 3) or default pre-programmed response based on the communication identification (e.g., caller ID), 515. If there is no pre-programmed response assigned to the caller ID or category of the corresponding to the caller ID then the caller can be forwarded to a conventional voicemail, 520. If a pre-programmed response is automatically selected it can be processed in a similar matter as if it was manually selected (e.g., 526, 528), which is discussed in detail below. The availability of the subscriber may be set manually by the subscriber (e.g., setting the system into an automatic response mode, unavailable mode or the like) or may be detected from the access terminal settings (e.g., phone set to silent mode).

If the subscriber does examine the caller ID, the subscriber can determine whether to take the call, 514, (e.g., pressing a send key) and a conventional call is processed, 516, or forward it to a conventional mailbox, 518 (e.g., selecting an ignore soft key) where a message can be left on voicemail, 520. However, in conjunction with these options, the subscriber can also be presented with a list of context and/or pre-programmed responses, 522 (see, e.g., FIG. 6A and FIG. 6B). This allows the subscriber the opportunity to select a pre-programmed response from the list of pre-programmed responses, 524. If the subscriber does not make selection within an allotted time or chooses to not to select from the list, the call can be forwarded to the subscriber's voicemail, 520. Providing a timeout function provides the caller with a response within a reasonable time even if no action is taken. From the caller's perspective, the call will merely be a missed call that is forwarded to voicemail if no response is selected by the subscriber. Optionally, to facilitate an extended time for the subscriber to select a response, a message can be played informing the caller to hold for a response. If a response is selected, then the selected pre-programmed response is retrieved, 526, and the response (message) is provided to the caller allowing the subscriber to provide a response that is more detailed than forwarding a caller to a general voice mail, while still allowing the subscriber to continue with his activity with little or no interruption. Once the response is provided, the call may be ended, 530, or the caller may optionally be forwarded to the voicemail, 520, where a message may be left for the subscriber based on the information provided in the pre-programmed response. For example, a pre-programmed response for business contacts may state the subscriber is in a meeting this morning but will return the call that afternoon and may ask that the caller leave a convenient time to be contacted that afternoon in the subscriber's voicemail. In another example, the pre-programmed response may be even further customized for a specific individual, such as, "John, thank you for calling. I am currently in a meeting this morning but I would like to discuss project X with you this afternoon. Please leave a convenient time for me to call you this afternoon in my voicemail or send me an email to confirm a time for our teleconference." This could be selected 524 or set as an automatic pre-programmed response 515 for the contact "John", so that the John would get this message automatically if he called. After the message, the call can be forwarded directly to voicemail 520 so that a message can be left for the subscriber.

Figure 6A:
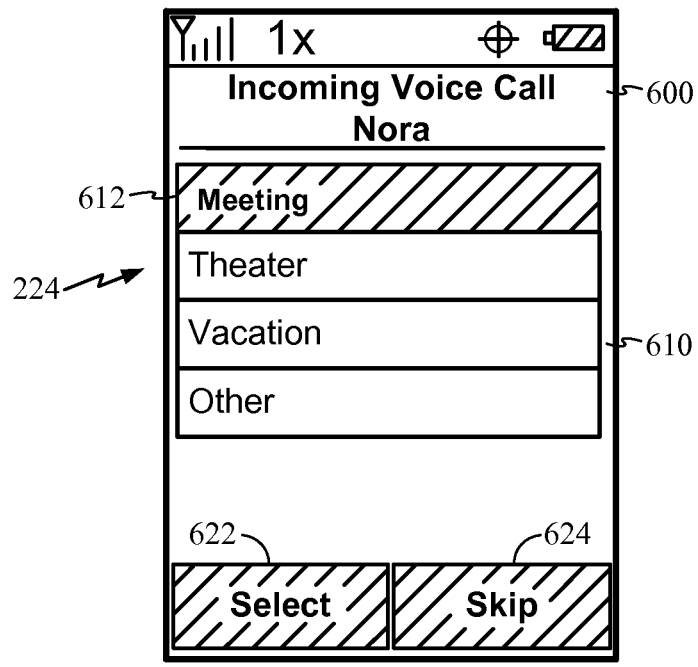
FIGS. 6A and 6B are illustrations of displays and menus on an access terminal.
Figure 6B:
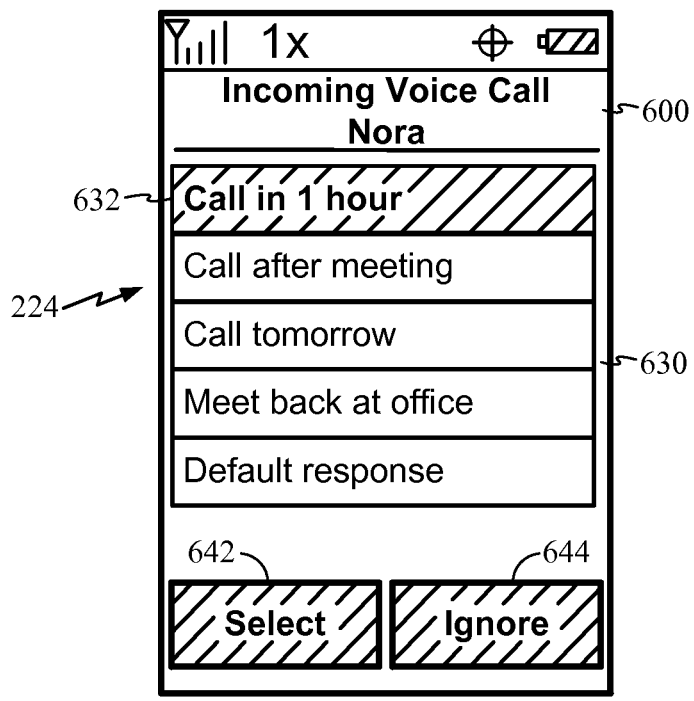

FIGS. 6A and 6B illustrate displays on an access terminal in accordance with at least one embodiment of the invention. These illustrations of the displays are merely provided for discussion of the invention and are not to be construed as limiting the invention. Further, those skilled in the art will appreciate that there are many design choices that can alter the displays and all such variations are within the scope of embodiments of the invention.

In FIG. 6A, a display 224 on an access terminal is illustrated. For example, when a communication is received, information identifying the communication, 600, can be displayed in a portion of the display 224. The information identifying the communication, 600, can include the type of communication (.e.g., voice call) and the identity of the caller (e.g., name, phone number). Additionally, a first menu, 610, of options can be displayed, such as a selection of the context for the pre-programmed response. As discussed above, a selection of a context may be used to refine the available messages. For example, if a "Meeting" context 612 is selected via soft key 622, then the next list of selections (see, e.g., FIG. 6B) can be refined to appropriate messages for the meeting context. Alternatively, the subscriber can choose to skip this filter (e.g., selecting soft key 624) so that all pre-programmed messages are displayed.

Referring to FIG. 6B, assuming the meeting context was selected a list 630 of pre-programmed responses for that context can be selected. For example, each of these responses may include the indication that the subscriber is in a meeting and will return the call or respond in another manner (e.g., meet back at the office). Thus, the subscriber can provide the caller with contextually relevant information by selecting one of the pre-programmed messages, 632, which reduces the subscriber's interruption while providing the caller with more relevant information then just a generic request to leave a message. Further, based on the communication identification, the list of pre-programmed responses can be further refined. For example, the list of pre-programmed responses for the meeting context may change for ID's in different categories (e.g., Business, Personal, etc.). Likewise, a default response or custom response may be associated with a specific contact, so that a specific response for that individual may be customized and selected (e.g., using soft key 642), such as the foregoing example requesting a caller to confirm a time for a teleconference about a project. However, if the subscriber is not satisfied with any of the pre-programmed options, the subscriber can choose to ignore the call, 644, (e.g., by selecting soft key 644 or failing to act) at which point the call can be forwarded to voicemail.

As will be appreciated from the foregoing examples, embodiments of the invention can use multiple criteria to provide robust context driven responses to a wide range of callers in response to received calls. Further, leveraging existing information, such as the category caller from the contacts manager in the access terminal (or on a server), reduces both the effort by the subscriber to maintain ID's associated with the pre-programmed responses and the memory used storing this data at the access terminal or on a server. For example, a subscriber could assign a pre-programmed response to categories and the pre-programmed response could be used for contacts in that category without specifically associating the pre-programmed response with each contact individually.

Also, as will be appreciated from the foregoing examples, embodiments of the invention can include apparatuses and systems for performing the functions discussed herein. For example, an embodiment of the invention can include an apparatus such as the access terminal 102 in FIG. 2, including logic configured to receive a communication, logic configured to identify the communication, logic configured to associate the communication with a pre-programmed response, and logic configured to respond to the communication using the pre-programmed response. However, in other embodiments, as discussed herein, the logic may reside on a server or a combination of both an access terminal and a server in communication with the access terminal. Those skilled in the art will appreciate that the functionalities described herein may be embodied in may forms and may be integrated into a single device or separated over many devices in communication with one another. Accordingly, the illustrated embodiments are not to be construed as limiting the scope of the invention.

Additionally, the apparatus can include logic configured to establish a context for the pre-programmed response and logic configured to determine available pre-programmed responses base on the context (see, e.g., FIGS. 6A and 6B). Further, embodiments can include logic configured to retrieve a pre-recorded audio message (e.g., from memory 212) and logic configured to respond to the communication by playing the pre-recorded audio message. For example, the access terminal 102 can use conventional hardware such as codecs and transceiver 206 to transmit the audio response back to the caller, as is known in the art. Audio input device 230 can be used to record the audio message or it can be recorded and stored using any known method. For example, the audio message can be recorded on a remote computer and uploaded to the access terminal 102 via the RAN 120, removable media (e.g., SD RAM) or stored directly on a server on the carrier network 126.

Those skilled in the art will appreciate that any of the functions described herein can be embodied as various logic elements (whether hardware, software, computer readable media or combinations of each) in the apparatus. For example, embodiments of the invention can include, among other functions described herein, apparatuses further having logic configured to display identification information for the communication and a list of pre-programmed responses, logic configured to associate the pre-programmed response with the communication based on a selected pre-programmed response from the list, logic configured to logic configured to determine a category based on the identification information and to limit the list of pre-programmed responses based on the category. Accordingly, embodiments of the invention are not limited to the logical elements expressly discussed herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. The logic may also be implemented using a combination of computing devices, e.g., a combination of a DSP and a microprocessor, a plurality of microprocessors, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an access terminal. In the alternative, the processor and the storage medium may reside as discrete components in the access terminal.

Accordingly, embodiments of the invention can include a computer readable media embodying a method for pre-programmed subscriber responses as discussed herein. For example, the method can include receiving a communication, identifying the communication, associating the communication with a pre-programmed response, and responding to the communication using the pre-programmed response. Accordingly, the invention is not limited to the illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method, comprising:
receiving a communication on an access terminal;
identifying the communication on the access terminal;
associating the communication with a pre-programmed response stored on the access terminal, wherein associating the communication with the pre-programmed response comprises:
displaying identification information for the communication on the access terminal;
displaying a list of contexts on the access terminal;
receiving a user selection of a context from the displayed list of contexts;
displaying a list of pre-recorded response messages on the access terminal based on the selected context, wherein:
each pre-recorded response message is recorded prior to receiving the communication and stored on the access terminal; and
each pre-recorded response message includes an indication to inform a recipient of the selected context;
receiving a user selection of a pre-recorded response message from the displayed list of pre-recorded response messages; and
associating the selected pre-recorded response message with the communication; and
responding to the communication from the access terminal using the selected pre-recorded response message.

2. The method of claim 1, wherein identifying the communication on the access terminal further comprises:
determining a type of communication on the access terminal; and
determining an identifier associated with the communication on the access terminal.

3. The method of claim 2, wherein the type of communication is at least one of a voice call, text message, Voice-Over-Internet Protocol (VoIP) call, or push-to-talk (PTT) call.

4. The method of claim 2, wherein the identifier is at least one of a phone number, name, email address, or Internet Protocol (IP) address.

5. The method of claim 1, wherein the selected pre-recorded response message is an audio message, and wherein responding to the communication from the access terminal comprises:
retrieving the pre-recorded audio message; and
playing the pre-recorded audio message as the response to the communication.

6. The method of claim 1, further comprising:
determining a category on the access terminal based on the identification information; and
limiting the list of pre-recorded response messages based on the category.

7. An access terminal comprising:
a display;
a memory; and
a processor coupled to the memory and to the display, wherein the processor is configured with software instructions to perform steps comprising:
receiving a communication on the access terminal;
identifying the communication;
associating the communication with a pre-programmed response stored in the memory; and
responding to the communication using the pre-programmed response, wherein associating the communication with the pre-programmed response comprises:
displaying on the display identification information for the communication;
displaying on the display a list of contexts;
receiving a user selection of a context from the displayed list of contexts;
displaying on the display a list of pre-recorded response messages based on the selected context, wherein:
each pre-recorded response message is recorded prior to receiving the communication and stored in the memory; and
each pre-recorded response message includes an indication to inform a recipient of the selected context;
receiving a user selection of a pre-recorded response message from the displayed list of pre-recorded response messages; and
associating the selected pre-programmed response message with the communication.

8. The access terminal of claim 7, wherein the processor is configured with software instructions to perform steps further comprising:
determining a type of communication; and
determining an identifier associated with the communication.

9. The access terminal of claim 8, wherein the type of communication is at least one of a voice call, text message, Voice-Over-Internet Protocol (VoIP) call, or push-to-talk (PTT) call and wherein the identifier is at least one of a phone number, name, email address; or Internet Protocol (IP) address.

10. The access terminal of claim 7, wherein the selected pre-recorded response message is an audio message and the processor is configured with software instructions to perform steps further comprising:
retrieving from the memory the pre-recorded audio message; and
playing the pre-recorded audio message.

11. The access terminal of claim 7, wherein the processor is configured with software instructions to perform steps further comprising:
determining a category based on the identification information; and
limiting the list of pre-recorded response messages based on the category.

12. A non-transitory processor-readable storage medium having stored thereon processor-executable software instructions configured to cause a communication device processor to perform steps comprising:
receiving a communication on the communication device;
identifying the communication on the communication device;
displaying identification information for the communication on the communication device;
displaying a list of contexts on the communication device;
receiving a user selection of a context from the displayed list of contexts;
displaying a list of pre-recorded response messages on the communication device based on the selected context, wherein:
each pre-recorded response message is recorded prior to receiving the communication and stored on the communication device; and each pre-recorded response message includes an indication to inform a recipient of the selected context;
receiving a user selection of a pre-recorded response message from the displayed list of pre-recorded response messages;
associating the selected pre-recorded response message with the communication; and
responding to the communication using the selected pre-recorded response message.

13. The non-transitory processor-readable storage medium of 12, wherein the stored processor-executable software instructions are configured to cause a communication device processor to perform steps further comprising:
determining a category based on the identification information; and
limiting the list of pre-recorded response messages based on the category.

14. An access terminal, comprising:
means for receiving a communication on the access terminal;
means for identifying the communication on the access terminal;
means for associating the communication with a pre-programmed response, comprising:
means for displaying identification information for the communication on the access terminal;
means for displaying a list of contexts on the access terminal;
means for receiving a user selection of a context from the displayed list of contexts;
means for displaying a list of pre-recorded response messages on the access terminal based on the selected context, wherein:
each pre-recorded response message is recorded prior to receiving the communication and stored on the communication device; and
each pre-recorded response message includes an indication to inform a recipient of the selected context;
means for receiving a user selection of a pre-recorded response message from the displayed list of pre-recorded response messages; and
means for associating the selected pre-recorded response message with the communication; and
means for responding to the communication using the selected pre-recorded response message.

15. The access terminal of claim 14, wherein means for identifying the communication on the access terminal comprises:
means for determining a type of communication on the access terminal; and
means for determining an identifier associated with the communication on the access terminal.

16. The access terminal of claim 15, wherein the type of communication is at least one of a voice call, text message, Voice-Over-Internet Protocol (VoIP) call, or push-to-talk (PTT) call.

17. The access terminal of claim 15, wherein the identifier is at least one of a phone number, name, email address, or Internet Protocol (IP) address.

18. The access terminal of claim 14, wherein the selected pre-recorded response message is a pre-recorded audio message, and wherein means for responding to the communication comprises:
means for retrieving the pre-recorded audio message; and
means for playing the pre-recorded audio message as the response to the communication.

19. The access terminal of claim 14, further comprising:
means for determining a category based on the identification information; and
means for limiting the list of pre-recorded response message based on the category.

* * * * *